United States Patent [19]

Heneker

[11] Patent Number: 4,852,606

[45] Date of Patent: Aug. 1, 1989

[54] FLUID FLOW CONTROL APPARATUS

[76] Inventor: Stephen R. Heneker, 60 Broadwood Avenue, Ruislip, Middlesex HA4 7XR, United Kingdom

[21] Appl. No.: 99,397

[22] Filed: Sep. 21, 1987

[30] Foreign Application Priority Data

Sep. 23, 1986 [GB] United Kingdom ............... 8622862

[51] Int. Cl.$^4$ ............................................. G05D 7/01
[52] U.S. Cl. ................................. 137/495; 137/505.13; 137/510; 251/57
[58] Field of Search ............... 137/495, 505.13, 510; 251/57

[56] References Cited

U.S. PATENT DOCUMENTS

| 2,942,619 | 6/1960 | Jackson | 137/505.13 X |
| 3,113,756 | 12/1963 | Griffo | 251/57 |
| 3,123,094 | 3/1964 | Toschkoff | 137/505.13 |
| 3,216,441 | 11/1965 | Thorsheim | 251/57 X |

Primary Examiner—Robert G. Nilson

Attorney, Agent, or Firm—Christie, Parker & Hale

[57] ABSTRACT

A pillar tap has a main water chamber and a control chamber housed within the main chamber. The control chamber has two different sized openings. The smaller opening which is located opposite the main outlet valve seat of the main chamber supports a membrane. The membrane in turn supports a valve member for movement into and out of engagement with the valve seat. The larger of the two openings is closed by a resilient diaphragm. A pair of control valves and control the admission and release of water to and from the control chamber. By controlling the control valves and the pressure differential between the main and control chambers and can be varied and so used to control the degree to which the valve member is opened. Once the flow rate through valve seat has been set, the diaphragm responds to pressure variations in the main chamber to alter the position of the valve member in a sense to maintain a substantially constant flow rate irrespective of the pressure variations.

6 Claims, 5 Drawing Sheets

FLUID FLOW CONTROL APPARATUS

BACKGROUND OF THE INVENTION

1. Field of the Invention

The present invention relates to fluid flow control apparatus.

2. Description of the Prior Art

British patent specification No. 2,124,338 discloses pillar tap incorporating a fluid flow control system in which the pressure of water is used to assist the opening and closing of the tap.

In particular an isolated chamber is provided with an opening in which is mounted a flexible diaphragm carrying a valve member for controlling the flow of water from the tap. By allowing the entry of water into the chamber the valve member can be urged by the resultant increase in pressure in the chamber, into contact with a main valve seat to shut off the tap. By releasing water from the chamber the pressure in the chamber is reduced and the valve member can be forced by the pressure of the water supply acting n that part of the valve member not shielded by the valve seat, away from the valve seat to allow the flow of water from the tap.

Once the chamber is sealed the gap between the valve member and valve seat will remain substantially constant and any fluctuation in the pressure of water supplied to the tap will be manifest by a change in the rate of flow of water from the tap. If the water in the sealed chamber contains entrained air bubbles then the gap between the valve member and the valve seat will vary with changes in water pressure but in such a sense as to amplify the changes in flow rate. Such fluctuations in flow rate are undesirable particularly when the tap forms one of a pair of taps used in a hot and cold water mixing arrangement.

It is an object of the invention to provide an improved tap.

SUMMARY OF THE INVENTION

According to the invention there is provided fluid flow control apparatus comprising a valve seat defining an outlet port, a valve member supported by a membrane for movement towards and away from the valve seat to control the flow of fluid through the port, means for supplying fluid under pressure to the valve member over a part of the face of the valve member not shielded by the valve seat, first control means responsive to a command, to vary the pressure on the opposite side of the membrane so as to allow the fluid pressure on the one side of the membrane to displace the valve member away from the valve seat by a predetermined extent to achieve a predetermined flow from the port, and second control means responsive to variations of pressure in the fluid supplied to the port to adjust the pressure on the said opposite side of the diaphragm in a sense and by an amount to tend to maintain the rate of flow from the outlet substantially constant over a predetermined range of pressure variations in the fluid supplied.

According to the invention there is further provided fluid flow control apparatus comprising a base member having an upstanding skirt, an inverted cup-shaped member in nested engagement with the skirt of the base member to define with the base member an enclosed chamber, the floor of the base member within the enclosed chamber defining an inlet and a valve seat, said valve seat forming an outlet, a membrane covering said inlet and said outlet and carrying a valve member so positioned as to be movable into and out of engagement with the valve seat in response to displacement of the membrane towards and away from the said floor, a cup-shaped member having a base mounted to urge said membrane against said floor, the base of the cup-shaped member having an opening to allow an area of the membrane extending over at least said inlet and said outlet, freedom to move towards and away from said floor in response to differential pressure across said membrane to control the flow of fluid from the inlet to the outlet, a carrier located in said cup-shaped member and supporting a resilient diaphragm in sliding and sealing engagement with the inner wall of the cup-shaped member to form a sealed chamber within said enclosed chamber, an incompressible fluid in said sealed chamber, means for displacing said carrier to cause the diaphragm to vary the differential pressure across said membrane and means providing communication between said inlet and the enclosed chamber, to subject the diaphragm to variations in pressure occurring at the inlet so that the diaphragm will tend to alter the differential pressure across the membrane in a sense to maintain the flow rate from the inlet to the outlet constant.

According to the present invention there is still further provided fluid flow control apparatus comprising a main fluid flow chamber having a fluid inlet and a fluid outlet, a fluid control chamber housed within the main chamber, a membrane rigidly supported by the control chamber, adjacent to the fluid outlet, a valve member supported by the membrane for movement along a path into and out of engagement with the fluid outlet, a stretchable elastic diaphragm of greater surface area than the unshielded area of the membrane, the diaphragm forming part of the wall of the control chamber and being subject to pressure by fluid in the main chamber and means for increasing and decreasing the pressure within the control chamber to allow the pressure difference exerted on the membrane by the fluid in the main chamber on the one hand and the fluid in the control chamber on the other hand, to move the valve to and from the outlet whereby any pressure change in the fluid in the main chamber will cause a corresponding change in pressure in the control chamber through the diaphragm which change in pressure in conjunction with the resilience of the diaphragm will move the valve in a sense to maintain the flow of fluid from the outlet substantially constant.

BRIEF DESCRIPTION OF THE DRAWINGS

Fluid flow control apparatus embodying the present invention will now be described, by way of example, with reference to the accompanying drawings in which.

DESCRIPTION OF THE PREFERRED EMBODIMENTS

Figure 1:
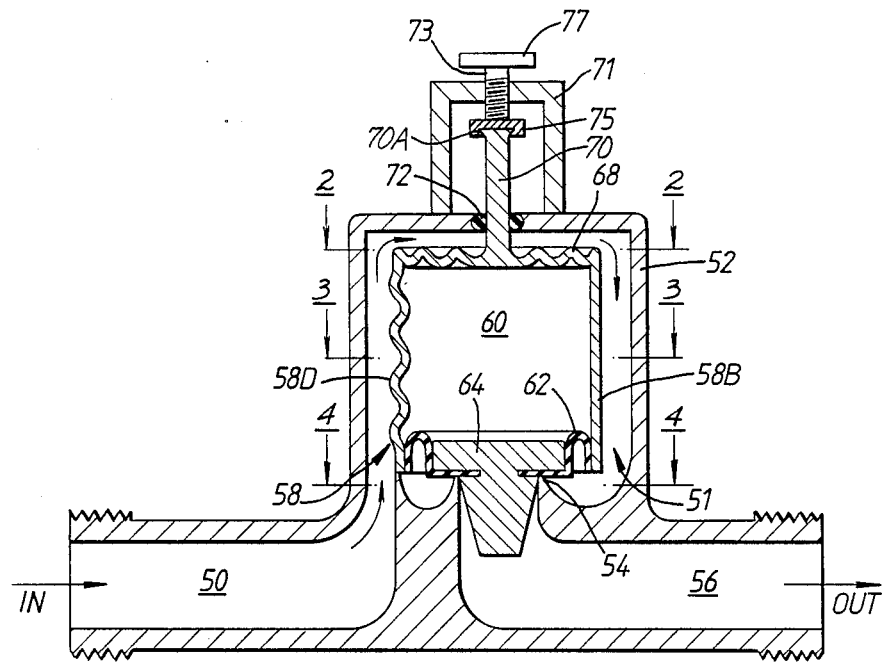
FIG. 1 is a longitudinal section through one form of apparatus.
Figure 2:
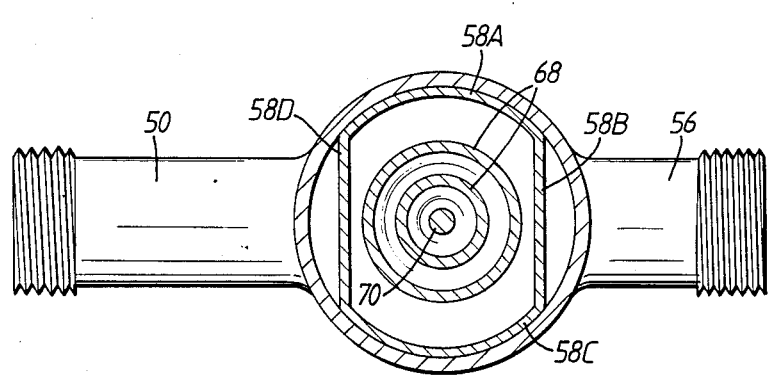
FIG. 2 is a section taken on the line A—A of FIG. 1.
Figure 3:
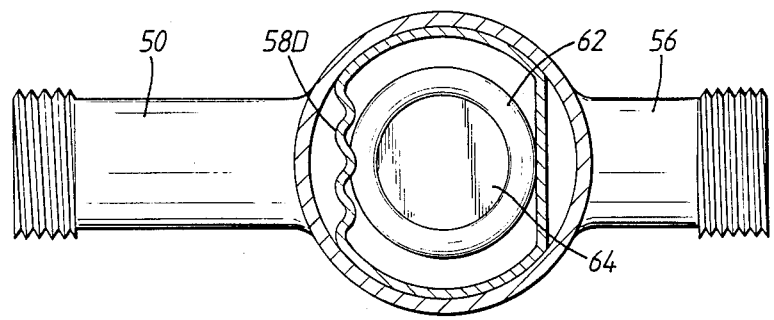
FIG. 3 is a section taken on the line B—B of FIG. 1.

FIGS. 1 to 4 show one embodiment of a valve incorporating a flow stabilser arrangement.

As shown the valve has an inlet conduit 50 leading to a control chamber 51, a valve seat 54 in the said floor, a cup-shaped member having a base outlet conduit 56 leading from the valve seat 54.

Housed within the chamber 51 is an elongate closed container 58 filled with an incompressible liquid 60 for example water or oil.

Figure 4:
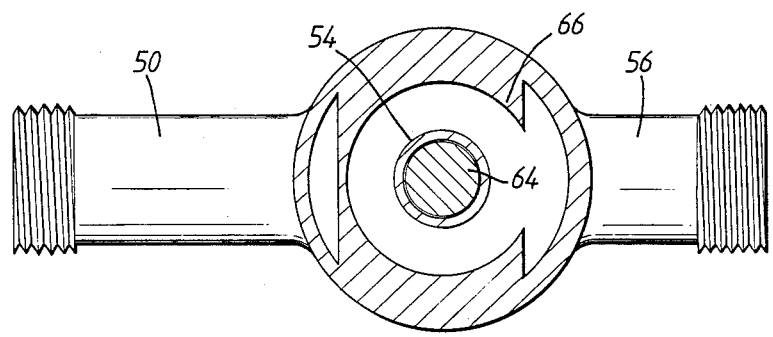
FIG. 4 is a section taken on the line C—C of FIG. 1.

The lower rim of the container 58 is supported on a land 66 in the bottom of the chamber 51, which land 66 extends generally about the valve seat 54 (see FIG. 4).

The underside of the container 58 is closed by a flexible membrane 62 which in turn supports a centrally located valve member 64 for vertical movement. The vertical axis of movement of the valve member 64 is in alignment with the axis of the valve seat 54. The roof 68 of the container 58 is of undulating profile to allow it to flex more readily. A rigid rod 70 is attached to a central portion of the roof 68 and passes through an opening in the roof of the housing 52 and has a flange 70A at its upper end. An O-ring 72 is provided to provide a water tight seal between the rod 70 and the housing 52 at the point at which the rod 70 passes through the housing 52.

The housing 52 carries a frame 71 on which a stem 73 is screwthreadedly supported. The stem 73 carries a lower abutment 75 which engages the flange 70A of the rod 70 to effect displacement of the rod 70. The flange 70A is constrained against axial movement relative to the abutment 75, but not against rotary movement. The upper end of the stem 73 carries a handle 77 for effecting rotation of the stem 73.

The container 58 has four side walls; one pair of opposite walls 58A and 58C being of arcuate configuration and conforming to the inner surface of the housing 52 to hold the container rigidly in position within the chamber 51, a third wall 58B being planar, and a fourth wall 58D being of undulating profile so as to enable it to flex more readily.

The container 58 is of an acetal copolymer and is such that upon flexure of any wall it will resile. The membrane 62 is made of a meltprocessable elastomer for example Santoprene (Registered Trade Mark) having little or no resilience.

As can be seen, the profiles of the container 58 and the chamber 51 are such that water entering the inlet conduit 50 will pass through the gap between the wall 58D and the housing 52, over the roof 68 of the container, through the gap between the wall 58B and the housing 52 to the underside of the membrane 62. When the valve member 64 is lifted off the valve seat 54, water will then flow through the valve seat and out along the outlet conduit 56.

In operation with the rod 70 held in its depressed state by the stem 73, the roof will be bowed inwardly and so the incompressible liquid in the container will act on the membrane 62 to displace the valve member 64 into engagement with the valve seat 54. In this position (see FIG. 1) a central area of the membrane 62 is shielded from the water pressure. Since the roof 68 has a greater area subjected to water pressure than the unshielded part of the membrane 62 there will be a net force on the container acting to urge it towards the valve seat 54 and since the contents of the container are incompressible this net force will be the force acting on the valve member 64 to maintain it closed.

To open the valve member 64 the stem 73 is lifted to raise the rod 70. This will pull the roof 68 upwardly increasing the volume inside the upper portion of the container 58. This now allows the pressure on the underside of the unshielded part of the membrane to displace the valve member 64 upwardly thus releasing water from the chamber 51 into the outlet conduit 56.

The extent of upward movement of the valve member 64 will depend upon the extend to which the volume in the upper part of the chamber has been increased and this in turn will depend upon the upward movement of the rod 70. Thus the flow rate through the valve will vary as a function of the displacement of the rod 70.

When a required flow rate is achieved, this flow rate will remain constant so long as the pressure of the water in the inlet conduit 50 remains constant. If the pressure were to increase the flow rate would tend to increase and vice versa. However, the provision of an undulating resilient wall 58d acts to compensate for variations in pressure. The undulating wall 58d is arranged to have a greater surface area than that of the unshielded part of the membrane 62 and thus if the pressure inside the chamber rises, the wall 58d will be bowed inwardly by this increase in pressure and the displaced liquid in the container 58 will act on the membrane 62 to displace the membrane 62 downwardly.

This has the effect of moving the valve member 64 towards the valve seat 54.

It will thus be seen that an increase in water pressure will tend to increase the flow rate through the valve but the consequent reduction in the gap between the valve member 64 and the valve seat 54 will tend to reduce the flow rate and so the net result is that the flow rate remains unchanged.

Similarily any reduction in water pressure will allow the resilient wall 58d to return towards its unstressed state under its own resilience and thus will allow the valve member 64 to rise to increase the gap between the valve member 64 and its seat 54.

The reduction in pressure accompanied by the slight corresponding opening of the valve will tend to maintain the flow rate through the valve unchanged.

The rod 70 may be coupled to any conventional water control mechanism, for example that which is found in a conventional tap.

This type of valve is particularly advantageous in situations where two sources of water (eg one hot and one cold) are mixed together. Thus if one such valve is used to control the hot water and the similar valve used to control the cold water then once the mixture ratio has been set it will be maintained substantially constant.

Another form of fluid flow control apparatus will now be described in conjunction with FIGS. 5 and 6.

Figure 5:
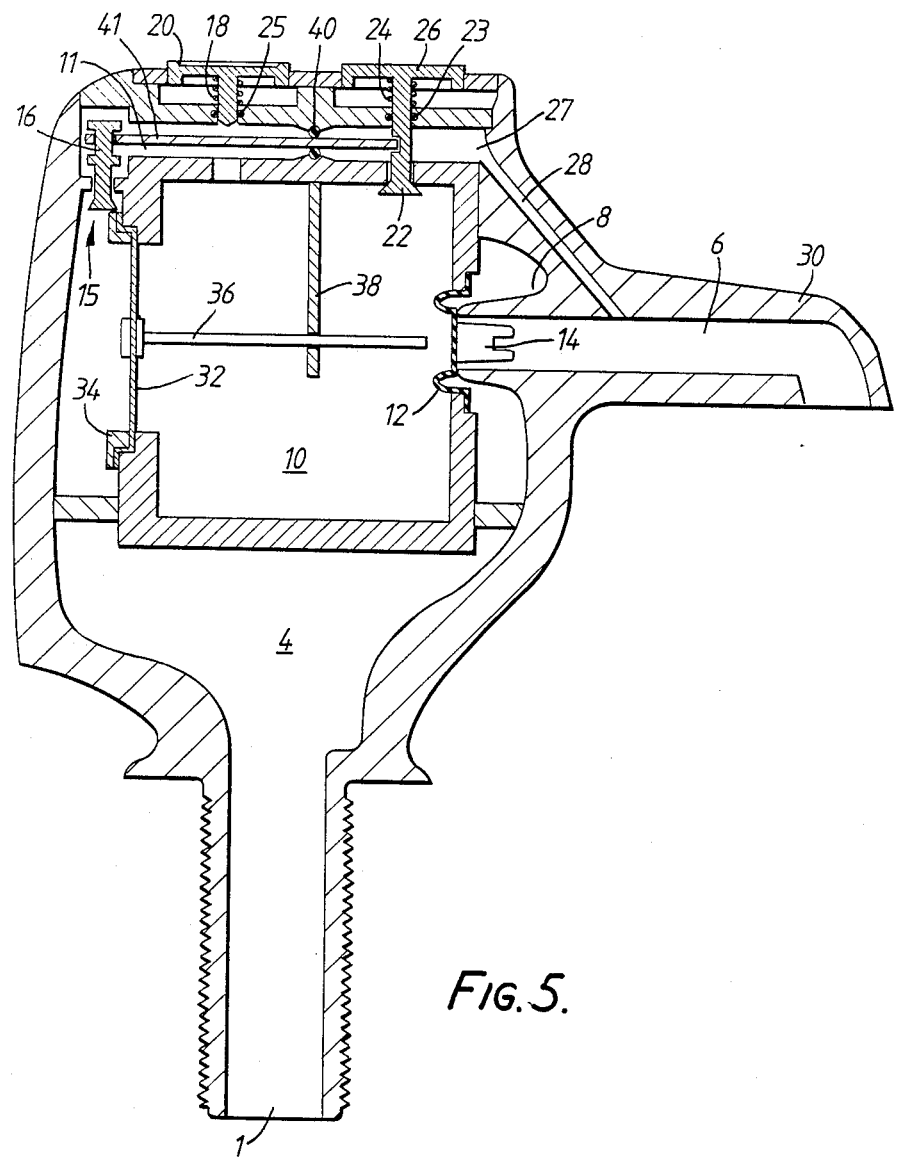
FIG. 5 is a section through a domestic pillar tap with the tap closed.
Figure 6:
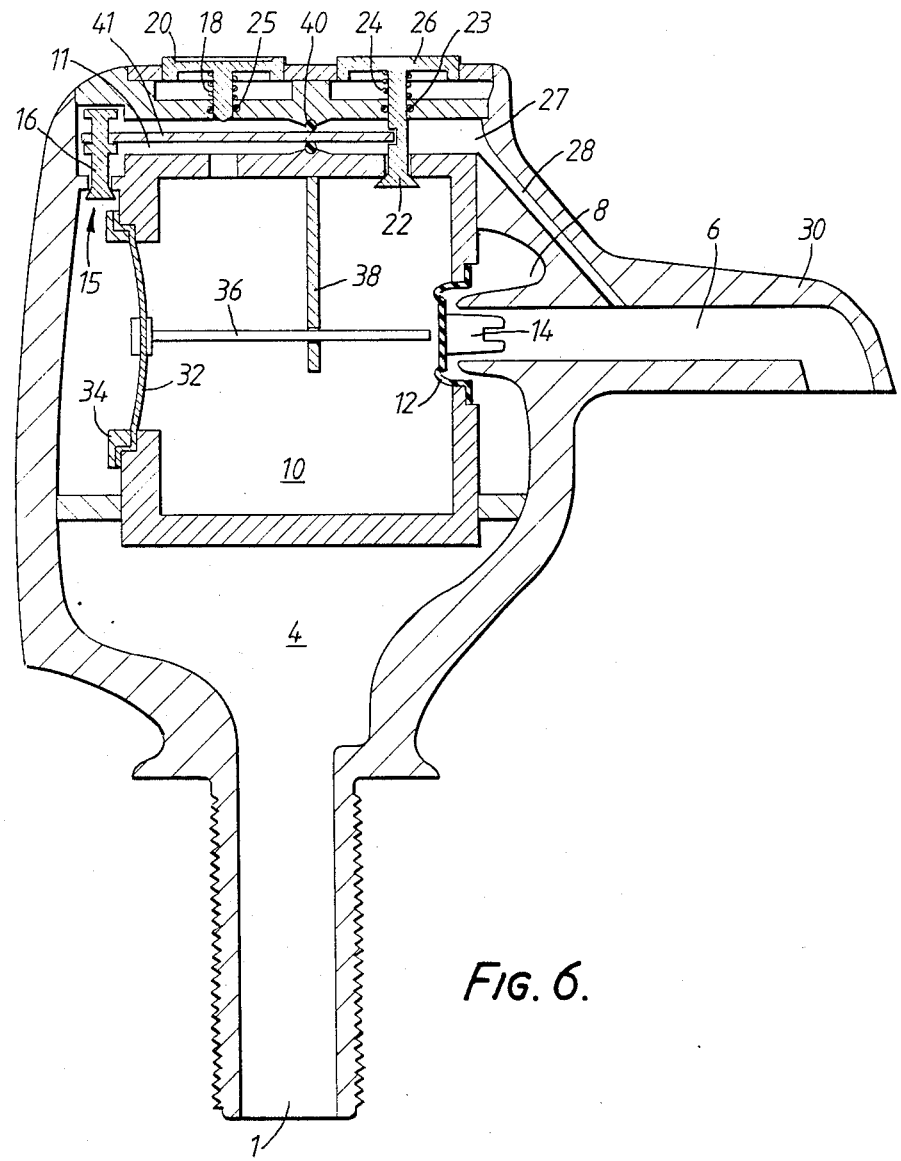
FIG. 6 is a section through a domestic pillar tap with the tap open.

The domestic pillar tap shown in FIG. 5 includes a stem 1 through which water under pressure is supplied into a main chamber 4 within the tap.

The main chamber 4 has a valve seat 8 which leads to an outlet port 6 from which water from the main chamber 4 will discharge.

Supported within the main chamber 4 is a control chamber 10. The control chamber 10 has an opening opposite the valve seat which supports a flexible membrane 12 carrying a valve member 14.

The membrane 12 supports the valve member 14 for movement along a path into and out of engagement with the valve seat 8. If the pressures within the two chambers 4 and 10 are equal there will be a net force acting on the valve member 14 to urge it into engagement with the valve seat 8. This is because a greater area of the membrane 12 and valve member 14 is exposed to the pressure from the control chamber 10 than the area of the diaphragm and valve member which is exposed to the pressure from the main chamber 4.

The control chamber 10 communicates with an ante-chamber 11 which in turn communicates with the main chamber 4 through a valve 15. The valve 15 includes a valve member 16 which is biassed downwardly by gravity (under its own weight) into an open state.

Water from the main chamber 4 is admitted to the control chamber 10 to ensure that the valve member 14 is firmly urged against the valve seat 8.

A control valve 22 in a wall of the control chamber 10 is normally biassed into a closed state by another coil spring 24. A push button 26 can be depressed against the force of the spring 24 to open the valve 22. Opening of the valve 22 releases water from the control chamber 10 to an exhaust chamber 27 and from there along a passage 28 through the port 6 in the spout 30 of the tap.

The ante-chamber 11 and the exhaust chamber 27 are separated by a wall. A pivotal rod 41 extends through this wall but is sealed to the wall by an O-ring seal 40. The O-ring seal 40 acts as a pivot for the rod 41, one end of the rod 41 is coupled to the valve 22 while the other end is coupled to the valve member 16. While there is some degree of lost motion in the couplings between the rod 41 and the valve 22 and valve member 16 the action is generally such that when the valve 22 is opened the rod 41 acts to close the valve 15 and vice versa.

A push button 20 can be depressed against the force of a spring 18 to engage the rod 41 and cause the rod to pivot in an anti-clockwise sense (as viewed in the drawings). When the valve 15 is closed this action will both open the valve 15 and close the valve 22. Opening of the valve 15 admits water from the main chamber 4 through the ante-chamber 11 to the control chamber 10.

O-rings 23 and 25 provide a seal around the stems of respective push buttons 26 and 20 to prevent the escape of water.

The control chamber 10 also has another opening substantially larger than that which supports the membrane 12. This opening is closed by an elastic diaphragm 32 which is clamped around the opening by a clamp 34.

Secured to a central portion of the diaphragm 32 is a rod 36. The rod 36 is slidably supported between the diaphragm 32 and the valve member 14 by a support 38. The rod 36 acts to limit relative movement between the diaphragm 32 and the valve member 14.

In operation under steady state conditions with the valve member 14 seated in the valve seat 8 and the pressures in the two chambers equal, the valve member 14 will be urged against the valve seat. This is because a greater area of the membrane 12 and valve member 14 is exposed to pressure from within the chamber 10 than from the chamber 4. In effect the area exposed to pressure from chamber 4 is reduced by the area of the valve seat 8, which shields a part of the valve member 14 from the chamber 4. To open the valve member 14 the button 26 is pressed against the force of the spring 24, both to open the valve 22 and via the rod 41 to close the valve 15. Once closed the valve 15 will be held closed by the pressure of water in the main chamber 4. This relieves the pressure in the control chamber 10 and so the pressure of water in the chamber 4 will displace the valve member 14 away from the valve seat 8. In doing so some water is expelled from the chamber 10 through the port 6 via the exhaust chamber 27 and the passage 28. At the same time the pressure in the chamber 4 acts on the diaphragm 32, against its resilience, to cause it to bow inwardly (see FIG. 2). The diaphragm 32 is thus stretched and in being stretched stores energy.

When a desired flow rate from the spout 30 is achieved, the button 26 is released and the valve 22 will close under the force of the spring 24 and as stated earlier the valve 15 will be held closed by the pressure of water in the main chamber 4. In this state the control chamber is sealed and the diaphragm 32 and valve member 14 will be held in their positions by the balance of pressures within the two chambers 4 and 10.

If the water supplied to the stem 1 undergoes any change in pressure, for example, as a result of some other use of the water within the dwelling, there will immediately be an unbalance of pressures in the two chambers 4 and 10.

This unbalance will cause a change in the shape of the membrane 32.

If the pressure in the chamber 4 drops, the diaphragm under its own resilience will dissipate some of its stored energy and tend to return to its initial position. This produces a reduction in the pressure within the control chamber 10. The resulting pressure difference across the membrane is such as to displace the valve member 14 further away from the valve seat. When the pressure within the chamber 4 drops this will tend to reduce the flow rate from the spout 30, however the consequent enlargement of the gap between the valve member 14 and the valve seat 8 will tend to increase the flow rate of water from the spout, therefore the combination of these two effects is to maintain the outlet flow rate substantially constant.

If instead of dropping in pressure, the water pressure in the chamber 4 increases, the opposite effect will take place The pressure in the control chamber 10, will increase by the inward bowing of the diaphragm 32 and the further storage of energy and this will cause the valve member 14 to move towards the valve seat 8 to reduce the gap between the valve member 14 and the valve seat 8.

To reduce or to stop the flow of water altogether from the spout 30 the button 20 is displaced against the bias of the spring 18. The stem of the button 20 will engage the rod 41 to cause the rod 41 to displace the valve member 16 downwardly and so open the valve 16. Simultaneously the other end of the rod 41 urges the valve 22 upwardly to ensure its closure. Water from the main chamber 4 is thus admitted to the control chamber 10. As water enters the chamber 10 it will cause the valve member 14 to close progressively. The button 20 is released when the desired flow rate from the spout 30 has been achieved or when the valve member 14 is firmly seated on the valve seat 8.

The water pressure in the main chamber 4 will then act on the valve member 16 to effect closure of the valve 15 and a new steady state condition will prevail.

It will thus be appreciated by the appropriate selection of the relative dimensions of the two openings respectively housing the diaphragm 32 and the diaphragm 12, (with the diaphragm opening being larger than the membrane opening) the flow from the spout 30 can be maintained substantially constant over a wide range of pressure fluctuations.

The provision of the rod 36 limits the maximum extent to which the valve member 14 will open when the valve 22 is opened. This is to provide a margin for increasing the gap between the valve member 14 and the valve seat 8 in response to a subsequent pressure drop within the chamber 4. The rod 36 can of course be omitted.

In a modification (not shown) instead of the pressure in the control chamber 10 being controlled by the admission and release of fluid it can be controlled by varying the volume of a portion of the chamber 10. For example, the chamber 10 may be provided with a flexible bulbous portion which is located between the facing surfaces of a clamp. By moving the facing surfaces of the clamp together the volume of the bulbous portion may be reduced and vice versa. This will have the same effect on the control chamber 14 as admitting or releasing water therefrom.

Advantageously the valve member 14 is fluted so as to provide a passage for water which increases in cross-sectional area in a non-linear relationship with distance of separation between the valve member 14 and valve seat 8. This provides greater sensitivity in the control of the flow of water at lower rates of flow and less sensitivity at higher rates.

Figure 7:
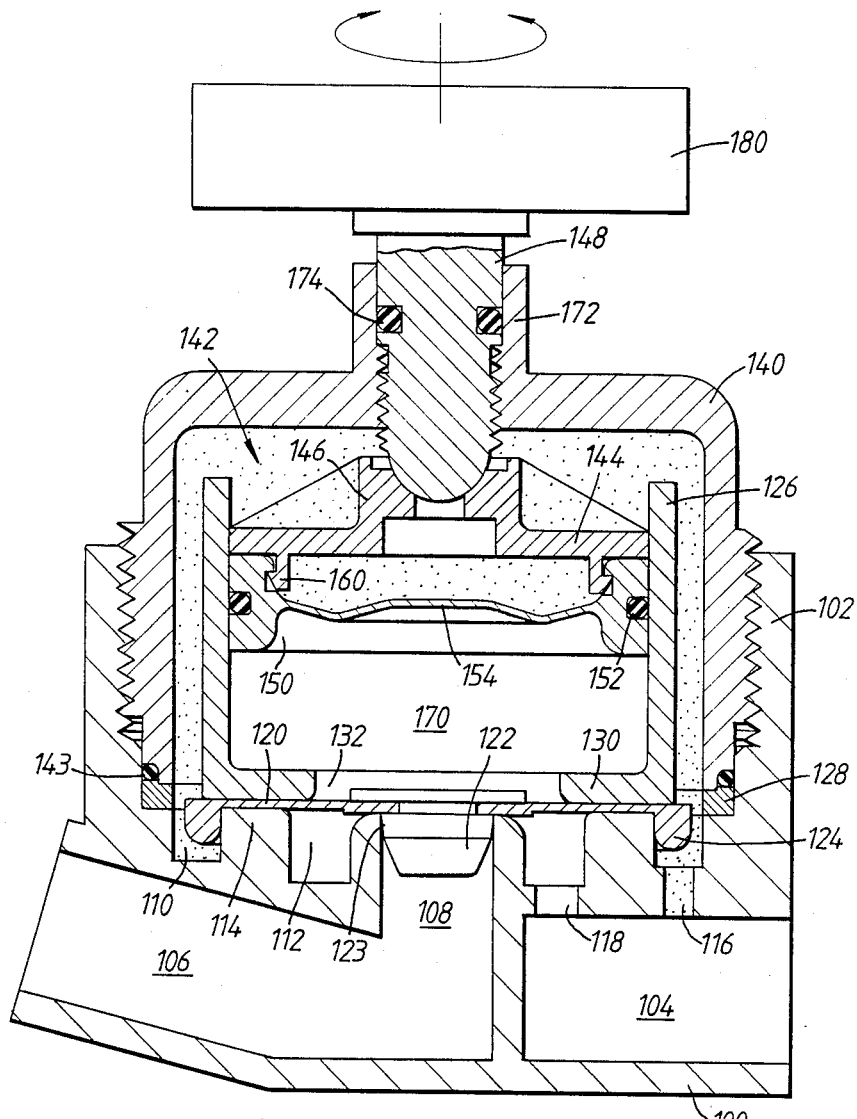
FIG. 7 is a section through another form of the apparatus.

The valve assembly shown in FIG. 7 is yet another form of the apparatus.

The valve assembly comprises a generally cylindrical base portion 100 supporting an annular upstanding skirt portion 102 which is internally screwthreaded. The cylindrical base portion 100 has a radially extending inlet 104 and a radially extending outlet 106. In the upper surface of the base portion 100 lies a central, axially extending recess 108 which communicates with the outlet 106. The central recess 108 is encircled by two spaced annular channels 110 and 112 which together define an annular land 114. The channels 110 and 112 communicate with the inlet via respective ducts 116 and 118.

A circular flexible membrane 120 has an outer circumferential rib 124 and carries a central valve member 122. The membrane 120 rests on the annular land 114 with its circumferential rib accommodated in the channel 110 and with the valve member located directly above the recess 108 so that it can move into and way from a valve seat 123 defined by the recess 108.

A cup-shaped member 126 located within the confines of the skirt 102 has a base 130 which rests on the diaphragm 120 and urges the membrane 120 in a fluid-tight manner against the land 114. The base 130 has a central opening 132 which allows the valve 122 to move axially, subject to the elasticity of the membrane 120. An annular flange 128 extends outwardly from the base 130 to engage an inner face of the skirt 102. The flange 128 is apertured to allow fluid to flow from the channel 110 to the annular space between the cup-shaped member 126 and the skirt 102.

An inverted cup-shaped member 140 has an externally screwthreaded cylindrical wall which screwthreadedly engages the internally screwthreaded skirt 102.

An O-ring 143 located above the flange 128 is engaged by the lower end of the inverted cup-shaped member 140 to provide a seal between the inverted cup-shaped member 140, the skirt 102 and the flange 128.

The inverted cup-shaped member 140 thus defines an enclosed chamber 142 which is sealed at its lower end by the diaphragm 120 but which communicates with the inlet 104 through the duct 116.

A carrier 144 having a central hub 146 is located inside the cup-shaped member 126 and is movable axially up and down the cup-shaped member 126 by a stem 148 rotatably coupled to the hub 146. The carrier 144 is apertured to allow the flow of fluid therethrough.

An annular support member 150 having a central resilient diaphragm 154 is coupled to the underside of the carrier 144 by means of a hook-shaped flange 160 engaging an annular recess on an inner side of the annular support 150. A circumferentially extending groove in the outer circumferential surface of the annular support member 150 accommodates an O-ring 152 which effects a seal between the support member 150 and the cup-shaped member 126 and so defines a sealed chamber 170. The sealed chamber 170 is filled with an incompressible fluid for example water or oil.

The inverted cup-shaped member 140 has at its upper end a central internally screwthreaded collar 172 which accommodates, and is in screwthreaded engagement with, the stem 148.

A circumferentially extending groove in the external surfaces of the stem 148 accommodates an O-ring 174 which defines a seal between the stem 148 and a non-screwthreaded portion of the internal surfaces of the collar 172. The upper end of the stem 148 carries a handle or knob by means of which the stem can be rotated.

In operation to open the valve assembly from the closed position shown in FIG. 7 the knob 180 is rotated to raise the stem 148. This in turn lifts the carrier 144 and the annular support 150 with the diaphragm 154. Since the fluid in the chamber 170 is incompressible, fluid pressure in the annular channel 112 and communicated from the inlet 104, will raise the flexible membrane 120 and this in turn will lift the valve member 122 off the valve seat. Fluid will now flow from the inlet 104 to the outlet 106 at a rate dependent upon the gap between the valve member 122 and the valve seat and upon the fluid pressure. The rate of flow can be increased or decreased by raising or lowering the stem 148.

Fluctuations in pressure in the inlet 104 are communicated to the chamber 142 and these will act on the resilient diaphragm 154 which in turn will move the valve member 122 in a sense to maintain the rate of flow substantially constant for the particular setting of the stem.

It will also be appreciated that while the described embodiment relates to the use of the apparatus in a domestic water tap it can equally be used to control the flow of other liquids and gases in various industrial processes.

The use of the two such taps as described in a common mixer tap has the merit that, provided the temperatures of the hot and cold water supplies remain constant, the volume of the cold and hot water dispensed by the mixer tap, once set, will remain substantially constant and therefore so will the temperature of the mixed water outflow.

While presently preferred embodiments of the present invention have been illustrated and described, modifications and variations thereof will be apparent to those skilled in the art given the teachings herein, and it is intended that all such modifications and variations be encompassed within the scope of the appended claims.

I claim:

1. Fluid flow control apparatus comprising
a valve seat defining an outlet port,
a valve member, a membrane having a first side and a second side and supporting the valve member for movement towards and away from the valve seat to control the flow of fluid through the port, both the valve member and the membrane lying on the same side of the valve seat, means for supplying fluid under pressure to the first side of the membrane and to the valve member over a part of the face of the valve member not shielded by the valve seat, first control means responsive to a command, to vary the pressure on the second side of the membrane so as to allow the fluid pressure on the first side of the membrane to displace the valve member away from the valve seat by a predetermined extent to achieve a predetermined flow from the port, and second control means responsive to variations of pressure in the fluid supplied to the port to adjust the pressure on said second side of the membrane in a sense and by an amount to tend to maintain the rate of flow from the outlet substantially constant over a predetermined range of pressure variations in the fluid supplied.

2. Apparatus according to claim 1 wherein the first control means comprises means defining a sealed chamber having a first opening sealed by said membrane, and means for varying the pressure in the chamber.

3. Apparatus according to claim 2 wherein the second control means comprises a stretchable elastic diaphragm defining a part of the chamber wall, said diaphragm being exposed on a side outside chamber to the same pressure as the pressure of fluid supplied to the valve seat.

4. Apparatus according to claim 3 wherein the means for varying the pressure in the chamber comprises means for varying the volume of a selected portion of the chamber.

5. Fluid flow control apparatus comprising a body defining a main fluid flow chamber having a fluid inlet and a fluid outlet, a wall defining a fluid control chamber housed within the main chamber, a membrane rigidly supported by the wall adjacent to the fluid outlet, a valve member supported by the membrane for movement along a path intoand out of engagement with the fluid outlet, both the valve member and the membrane lying upstream of the fluid outlet, a stretchable elastic diaphragm of greater surface area than the area of the membrane less the area of the fluid outlet, the diaphragm forming part of the wall of the control chamber and being subject to pressure by fluid in the main chamber, and means for increasing and decreasing the pressure within the control chamber to allow the pressure difference exerted on the membrane by the fluid in the main chamber on the one hand and the fluid in the control chamber on the other hand, to move the valve to and from the outlet whereby any pressure change in the fluid in the main chamber will cause a corresponding change in pressure in the control chamber through the diaphragm which change in pressure in conjunction with the resilience of the diaphragm will move the valve in a sense to maintain the flow of fluid from the outlet substantially constant.

6. A faucet incorporating the apparatus according to claim 1 or to claim 5.

* * * * *